United States Patent Office 3,560,513
Patented Feb. 2, 1971

3,560,513
2-LOWER ALKYL-9,10-DIHYDRO-4H-BENZO[5,6]
CYCLOHEPTA[1,2-d] THIAZOL - 4 - ONES AND
THEIR PREPARATION
Eugene E. Galantay, Morristown, N.J., assignor to
Sandoz-Wander, Inc., Hanover, N.J.
No Drawing. Application Aug. 30, 1967, Ser. No. 664,313,
now Patent No. 3,442,903, which is a continuation-in-
part of application Ser. No. 610,780, Jan. 23, 1967.
Divided and this application Jan. 21, 1969, Ser. No.
792,766
Int. Cl. C07d 91/42
U.S. Cl. 260—302                                     5 Claims

ABSTRACT OF THE DISCLOSURE

The compounds are of the class of 4-(3-mono- and di-
alkylaminopropylidene)-2-lower alkyl - 9,10-dihydro-4H-
benzo[5,6]cyclohepta[1,2-d]thiazoles which are useful as
tranquilizers. The compounds are prepared by thiating a
2-lower alkyl-9,10-dihydro-4H-benzo[5,6]cyclohepta[1,2-
d]oxazol-4-one, treating the resulting benzocycloheptathi-
azol-4-one with a metallo dialkylaminopropyl halide
Grignard reagent and dehydrating the carbinol resulting
from the hydrolysis of the Grignard adduct to obtain the
corresponding 4-(3-dialkylaminopropylidene)-2-lower al-
kyl-9,10 - dihydro - 4H-benzo[5,6]cyclohepta[1,2-d]thia-
zole, which may then be N-dealkylated to the correspond-
ing 3-monoalkylaminopropylidene-containing analog.

---

This application is a division of copending application
Ser. No. 664,313, filed Aug. 30, 1967, now U.S. Pat. No.
3,442,903, which in turn is a continuation-in-part of co-
pending application Ser. No. 610,780, filed Jan. 23, 1967
(now abandoned).

This invention relates to tricyclic compounds. In par-
ticular, the invention pertains to benzocycloheptathiazoles
and methods for preparing the same. The invention also
relates to intermediates which are useful in preparing the
above compounds and processes for preparing said inter-
mediates.

The benzocycloheptathiazoles of the present invention
may be represented structurally as follows:

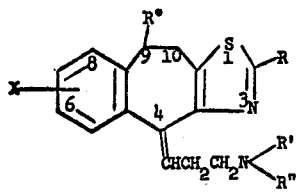

wherein
R represents lower alkyl, preferably containing from 1
to 4 carbon atoms, e.g., methyl, ethyl, propyl, isopropyl
and butyl;
R° represents hydrogen or phenyl;
R' represents hydrogen or lower alkyl, preferably con-
taining from 1 to 4 carbon atoms, e.g., methyl, ethyl,
propyl and butyl;
R" represents lower alkyl, preferably containing from
1 to 4 carbon atoms, e.g., methyl, ethyl, propyl, and
butyl; and
X represents hydrogen or halo, preferably having an
atomic weight of 35 to 80, i.e., bromo or chloro.

The compounds of structural Formula I wherein R'
is lower alkyl, i.e., Compounds Ia, are prepared by treat-
ing a 2-lower alkyl-9,10-dihydro-4H-benzo[5,6]cyclohep-
ta[1,2-d]oxazol-4-one with an alkali hydrosulfide to form
the corresponding 2-lower alkyl-9,10-dihydro-4H-benzo
[5,6]cyclohepta[1,2-d]thiazol-4-one, treating the latter
with a metallo dialkylaminopropyl halide Grignard re-
agent, hydrolyzing the resulting Grignard adduct to form
the corresponding 2-lower alkyl-4-hydroxy-4-(3-dialkyl-
aminopropyl) - 9,10 - dihydro-4H-benzo[5,6]cyclohepta
[1,2-d]thiazole and then dehydrating the latter. This
process may be illustrated as follows:

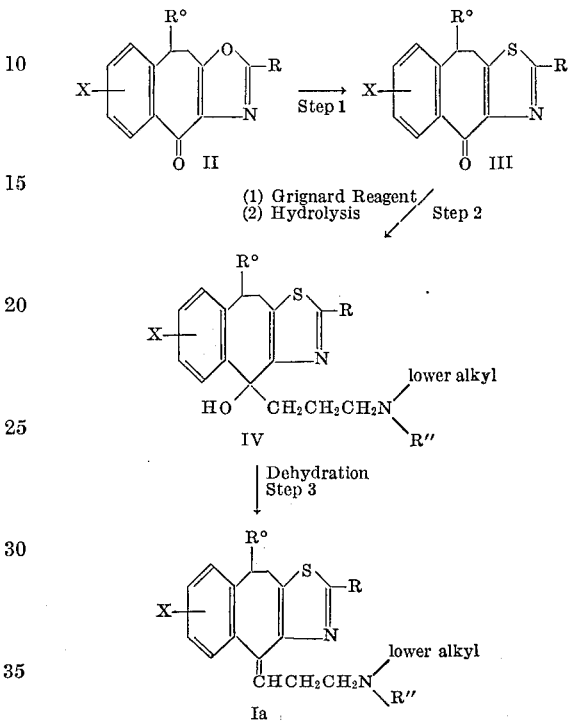

wherein X, R, R° and R" are as previously defined.

In Step 1 of the process, the benzocycloheptaoxazol-4-
one (II) is converted to the benzocycloheptathiazol-4-one
(III) by treatment with a sulfur containing reagent (thi-
ating agent) capable of replacing a ring oxygen atom
with a sulfur atom. The prefered reagents for this pur-
pose are the alkali-hydrosulfides, particularly, the alkali-
metal hydrosulfides, e.g., sodium hydrosulfide and potas-
sium hydrosulfide. However, other thiating agents, such
as phosphorus pentasulfide can also be used. The con-
version is conveniently effected in an inert polar organic
solvent, e.g., dimethylacetamide, diethylacetamide, di-
methylformamide, pyridine, quinoline and sulfolane, and
preferably at room temperature (20–25° C.), although
temperatures between 10° and 120° C. may be utilized.

In Step 2 of the process the tricyclic ketone (III) is
condensed with a metallo dialkylaminopropyl halide
Grignard reagent and the resulting Grignard adduct then
hydrolyzed to form the corresponding carbinol (IV). The
preparation of the Grignard reagent, the condensation
thereof with the tricyclic ketone and subsequent hydrolysis
of the resulting Grignard adduct are all carried out in the
same manner as has previously been described in the
prior art for the preparation of the dibenzocycloheptene
type ticyclic compounds. Thus, the metallo dialkylamino-
propyl halides may be prepared by the reaction of an
appropriate metal with an ethereal solution of the di-
alkylaminopropyl halide. The preferred Grignard reagent
is a dialkylaminopropylmagnesium halide, e.g., dimethyl-
aminopropylmagnesium chloride. Similarly, condensation
of the Grignard reagent with the tricyclic ketone is readily
effected in an inert organic solvent, e.g., absolute diethyl
ether, benzene and tetrahydrofuran. After the condensa-
tion has been effected, the Grignard adduct (condensate
product) is hydrolytically decomposed under practically neutral conditions, e.g., by hydrolysis in aqueous ammonium chloride solution.

Dehydration of the carbinol (IV) to the corresponding derivative (Ia), as indicated by Step 3, is likewise carried out in similar manner as that described in the prior art for the preparation of propylidene derivatives of dibenzocycloheptene from their corresponding carbinols. Thus, the dehydration step may be effected by heating with alcoholic hydrogen chloride. However, the numerous other reagents conventionally used for dehydrating similar carbinols of the dibenzocycloheptene type, e.g., phosphorus oxychloride, sulfuric acid and the like, may also be employed. Suitable inert organic solvents for use with dehydrating agents include ethanol, glacial acetic acid and xylene.

Compounds I wherein R' is hydrogen, i.e., Compounds Ib, are prepared by N-dealkylation of the corresponding Compound Ia according to the following procedure, i.e., reaction scheme B, wherein R, R°, R" and X are as defined above:

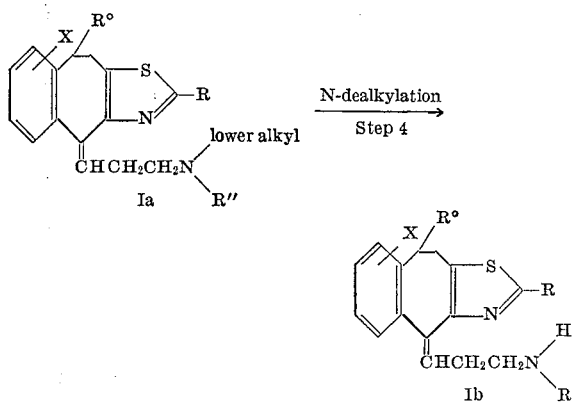

In reaction scheme B the N-dealkylation (Step 4) of Compound Ia, i.e., a 4-(3-dialkylaminopropylidene)-2-lower alkyl-9,10-dihydro-4H-benzo[5,6]cyclohepta[1,2-d]thiazole, to the corresponding Compound Ib, i.e., a 4-(3-monoalkylaminopropylidene)-2-lower alkyl-9,10-dihydro-4H-benzo[5,6]cyclohepta[1,2-d]thiazole may be accomplished by conventional means. It is preferred to accomplish the N-dealkylation by first reacting the Compound Ia with a lower linear alkyl chloroformate or chlorocarbonate, e.g., having from 1 to 6 carbon atoms in the alkyl moiety, such as ethyl, by heating, e.g., at from 80° to 200° C., in a suitable solvent, e.g., toluene, to form the corresponding carbamate ester intermediate (Compound Va), which is then hydrolyzed and decarboxylated by heating, e.g., 90° to 180° C., in a strongly basic medium, e.g., in a solution of 5 to 15 wt. percent potassium or sodium hydroxide in n-butanol, to form the corresponding Compound Ib. If desired, a von Braun N-dealkylation procedure can be employed for Step 4, e.g., by first converting a Compound Ia to its cyano-derivative (Compound Vb) by contacting a Compound Ia with cyanogen bromide in a suitable solvent, e.g., absolute benzene, at 4° to 40° C., and then decomposing the cyano-derivative by heating, e.g., at 100° to 200° C., preferably refluxing, with an aqueous mineral acid, e.g., hydrochloric acid (5 to 10 wt. percent), preferably in a suitable solvent, e.g., glacial acetic acid. In Step 4, preferably, the lower alkyl and R" substituents are the same.

The intermediates in the N-dealkylation (Step 4) may be represented structurally as follows (wherein X, R, R° and R" are as defined above):

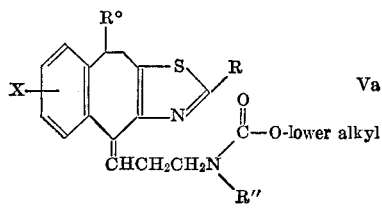

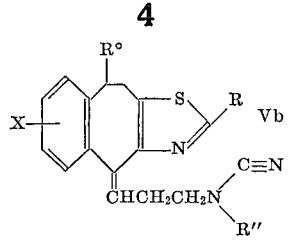

Compounds I have a double bond linking the mono- or dialkylaminopropylidene moiety to the 4-position of the tricyclic system. Hence, Compounds I exist as geometric isomers, i.e., in cis and trans forms. Compounds IV lack the double bond and therefore do not exist as geometrical isomers; but on dehydration (Step 3), a Compound IV yields the corresponding Compounds Ia as a mixture of geometric isomers. The mixture of isomers can be used directly as starting material for Step 4 (the N-dealkylation) or separation of isomers can be carried out and a material rich in one isomer used in Step 4 to yield a Compound Ib having a corresponding isomeric make-up. The geometric isomers of Compounds I can be separated by conventional means, e.g., by countercurrent distribution or by fractional crystallization of their salts, e.g., their acid fumarates, and are included in this invention.

In Compounds I wherein R° is other than hydrogen, the 9-carbon atom of the tricyclic system is an asymmetric carbon atom. Hence, a Compound I, wherein R° is phenyl can exist as a racemate or in an optically active form. The racemic form as well as the optical antipodes (enantiomers) are within the scope of this invention. Resolution of a racemate of a Compound I can be effected by conventional means, e.g., the use of optically active acids. In some cases greater pharmacological activity or other beneficial attributes may be found with respect to a particular geometric and/or optical isomer, and in such instances administration of such isomer may be preferred.

The compounds of Formula I are useful because they possess pharmacological activity in animals. In particular, such compounds possess tranquilizing activity and can be used as psychotherapeutic agents in the same manner as chlorpromazine, a known psychotherapeutic drug. Thus the compounds, in either their free base form or in the form of acid addition salts, e.g., hydrochloride, hydrobromide, sulfate, phosphate, oxalate, acetate, citrate, tartrate, p-toluenesulfonate and the like, may be admixed with conventional phamaceutical carriers or diluents and administered internally in the same manner as chlorpromazine. The daily dosage administered is likewise of the same order as that for chlorpromazine and appropriate dosage forms can be prepared accordingly.

The compounds of Formula I also possess antihistaminic, antiserotonin, anticholinergic, antiinflammatory, and analgesic activity.

The intermediate compounds of Formula III also exhibit pharmacological activity in animals. In particular, such compounds possess tranquilizing and antiinflammatory activity. For such uses the compounds may be admixed with conventional and pharmaceutical carriers or diluents and administered internally in the form of tablets, capsules elixirs, solutions or suspensions. The dosage administered will, of course, vary depending upon, the compound employed, mode of administration and treatment desired. However in general satisfactory results are obtained when administered at a daily dosage of from about 5 milligrams per kilogram of body weight to about 50 milligrams per kilogram of body weight preferably given in divided doses 2 to 4 times a day or in sustained release form. For the larger mammals as well as the smaller domestic mammals, dosage forms suitable for internal administration comprise from about 100 milligrams to about 500 milligrams of the compound admixed with a solid or liquid pharmaceutical carrier or diluent. A representative formulation is a tablet (prepared by standard tabletting procedures) and containing the following ingredients:

| Ingredient— | Parts by weight |
|---|---|
| 2-methyl - 9,10-dihydro-4H - benzo[5,6]cyclohepta[1,2-d]thiazol-4-one | 50 |
| Tragacanth | 2 |
| Lactose | 39.5 |
| Corn starch | 5 |
| Talcum | 3 |
| Magnesium stearate | 0.5 |

The compounds (II) employed as starting materials in the process described hereinabove are prepared by first nitrosating a 6,7,8,9-tetrahydro - 5H - benzocyclohepten-5-one to form the corresponding 6 - isonitroso-6,7,8,9-tetrahydro - 5H-benzocyclohepten-5-one and then treating the latter with an appropriate alkanoylating agent in the presence of a strong acid. This process may be illustrated as follows:

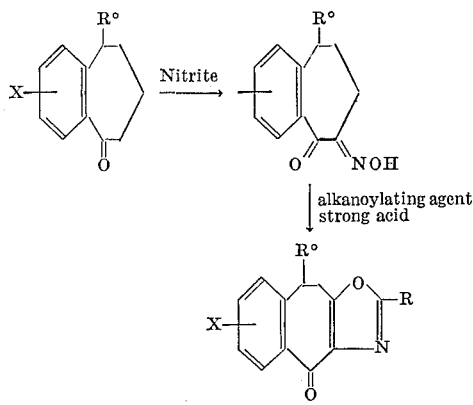

wherein X, R and R° are as previously defined.

The nitrosation is conveniently effected in conventional manner employing an appropriate inert organic solvent, e.g., benzene, toluene and diethyl ether, and a nitrite, preferably a lower alkyl nitrite, e.g., ethyl nitrite and butyl nitrite. Preferably the reaction is carried out at room temperature (20° C.) or below and in the presence of a strong anhydrous acid or base, such as hydrochloric acid or sodium methoxide, respectively. The 6,7,8,9,-tetryhydro-5H-benzocyclohepten-5-ones employed in the above process are either known and can be prepared as described in the literature or they can be prepared from available materials in analogous manner to that described in the literature for the preparation of the known compounds.

The 6 - isonitroso-6,7,8,9 - tetrahydro - 5H - benzocyclohepten-5-one is converted to the benzocycloheptaoxazol-4-one by treatment with an appropriate alkanoylating agent in the presence of a strong acid. Suitable alkanoylating agents include the lower alkanoic acids, e.g., acetic acid propionic acid and butyric acid, the corresponding acid anhydrides thereof, e.g., acetic anhydride, propionic anhydride and butyric anhydride, mixtures of lower alkanoic acids and their corresponding anhydrides, e.g., acetic acid and acetic anhydride, propionic acid and propionic anhydride and butyric acid and butyric anhydride, lower alkanoyl halides, e.g., acetyl chloride, propionyl chloride and butyryl chloride, and mixtures of alkanoyl halides with the corresponding alkanoic acids and/ or anhydrides such as mentioned above. The strong acid employed is desirably a mineral acid, preferably a hydrohalic acid, e.g., hydrochloric acid. The strong acid should be employed in an amount such that the reaction mixture is strongly acidic. Desirably, the reaction is carried out in the presence of at least 2 moles of strong acid per mole of the isonitroso compound. Preferably from 2.5 to 3 moles of strong acid per mole of isonitroso compound are employed. It is further desirable that the acidity of the reaction mixture is such that an aliquot portion thereof when diluted with water (1:10) gives a pH reading of not higher than 2 and preferably is in the range of from 0.5 to 1.5. The reaction can be carried out in an inert organic solvent if desired. However, the use of a solvent is not necessary since an excess of the alkanoylating agent can be employed for this purpose. If a solvent is employed, the choice thereof is not critical and any inert organic solvent conventionally used with alkanoylating agents of the type mentioned above can be employed. Similarly, the temperature at which the reaction is effected is not critical. In general, it is desirable to carry out the reaction at an elevated temperature of from about 60° to about 150° C. Preferably, the reaction is carried out at a temperature of from 80° C. to about 110° C. In most instances, the resulting product separates as a solid, when the reaction mixture is poured over ice or diluted with water, and can be recovered by filtration and further purified by crystallization in conventional manner. When the product separates as an oil, it can be readily extracted with a suitable solvent, e.g., benzene, and further purified by conventional techniques.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

4-(3 - dimethylaminopropylidene) - 2-methyl - 9,10-dihydro - 4H-benzo[5,6]cyclohepta[1,2-d]thiazole (mixture of cis and trans)

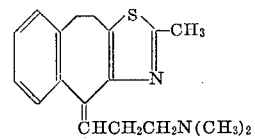

Step A—preparation of 6-isonitroso-6,7,8,9 - tetrahydro-5H-benzocyclohepten-5-one.—To a solution of 50 g. of 6,7,8,9-tetrahydro - 5H-benzocyclohepten - 5-one in 210 ml. of 0.35 N absolute ethereal hydrochloric acid is added, over a period of 15 minutes, 32.2 g. of n-butyl nitrite while maintaining the temperature of the reaction mixture between 15–20° C. (by external cooling). After crystallization commences petroleum ether is added and the resulting crystalline material filtered off and washed with petroleum ether to obtain 6-isonitroso-6,7,8,9-tetrahydro-5H-benzocyclohepten-5-one, M.P. 139–141° C.

Step B—preparation of 2-methyl - 9,10-dihydro - 4H-benzo[5,6]cycloheptal[1,2-d]oxazol - 4 - one.—Hydrogen chloride gas is passed through a mixture of 45 ml. of glacial acetic acid and 7.8 ml. of acetic anhydride for 15 minutes while maintaining the temperature of the mixture at 100° C. Thereafter 2.997 g. of 6-isonitroso-6,7,8, 9-tetrahydro-5H-benzocyclohepten - 5-one is immediately added while continuing the passage of hydrogen chloride gas through the mixture and maintaining the reaction temperature at 100° C. during the addition of the ketone and for an additional 15 minutes thereafter. The resulting mixture is then poured over ice containing 45 g. of sodium carbonate. The resulting solids are then recovered by filtration, washed first with water and then with small amounts of ethyl acetate and then dried to obtain 2-methyl - 9,10 - dihydro - 4H-benzo[5,6]cyclohepta[1,2-d]oxazol-4-one, M.P. 174–176° C.

Step C—preparation of 2-methyl - 9,10 - dihydro - 4H-benzo[5,6]cyclohepta[1,2-d]thiazol - 4 - one.—Hydrogen sulfide gas is passed through a suspension of 30.0 g. of potassium tertiary butoxide in 300 ml. of dry dimethylformamide. While continuing the introduction of hydrogen sulfide gas, the resulting suspension is cooled to 5° C. and then 15 g. of 2-methyl - 9,10 - dihydro-4H - benzo[5,6]cyclohepta[1,2-d]oxazol-4-one is added and the resulting mixture stirred for 30 minutes at 25° C. and then poured over 400 g. of ice. The resulting mixture is then carefully acidified to pH 4 with concentrated hydrochloric acid. The acidified mixture is filtered and the filtrate extracted twice with 150 ml. (each) of benzene. The combined benzene extracts are then washed with 60 ml. of water, dried over magnesium sulfate and evaporated. The residue is added to 30 ml. of diethyl ether and the resulting solids filtered off to obtain 2-methyl-9,10-dihydro-4H-benzo[5,6]cyclohepta[1,2-d]thiazol - 4 - one, M.P. 138–141° C.

Step D—preparation of 4-(3-dimethyl aminopropyl)- 4 - hydroxy - 2-methyl - 9,10-dihydro - 4H-benzo[5,6] cyclohepta[1,2-d]thiazole.—To a Grignard mixture, prepared in conventional manner by reacting 1.6 g. of magnesium with 8.2 g. of 3-dimethylaminopropyl chloride in 40 ml. of tetrahydrofuran at 0° C., is added 5.705 g. of 2-methyl - 9,10-dihydro-4H-benzo[5,6]cyclohepta[1,2-d] thiazol-4-one. The resulting mixture is maintained at 0° C. for 30 minutes and then 50 ml. of a saturated ammonium chloride solution is added. The organic layer is separated and the aqueous phase repeatedly extracted with diethyl ether. The combined ether extracts are dried over sodium sulfate and evaporated to obtain 4-(3-dimethylaminopropyl) - 4-hydroxy - 2-methyl - 9,10-dihydro-4H-benzo[5,6]cyclohepta[1,2-d]thiazole as a viscous oil.

Step E—preparation of 4-(3 - dimethylaminopropylidene) - 2-methyl-9,10 - dihydro-4H - benzo[5,6]cyclohepta[1,2-d]thiazole.—The product obtained in Step D is refluxed for 30 minutes with 100 ml. of 4.4 N ethanolic hydrochloric acid and the resulting mixture evaporated to dryness. The residue is dissolved in 100 ml. of water and the resulting mixture washed several times with ethyl acetate to remove any by-products. The aqueous phase is then made basic (pH 12) by the addition of 5 N sodium hydroxide solution and extracted three times with 50 ml. (each) of methylene chloride. The combined methylene chloride extracts are dried over sodium sulfate and evaporated. The resulting oil is distilled at 0.2 mm. pressure and 150–180° C. bath temperature to obtain 4-(3-dimethylaminopropylidene) - 2-methyl - 9,10 - dihydro - 4H-benzo[5,6]cyclohepta[1,2-d]thiazole as a mixture of cis and trans isomers.

NMR spectrum (60 megahertz, CDCl₃ solution)—
Vinyl protons: triplets centered at 351 and 392 cps.

EXAMPLE 2

2-methyl-4-(3-methylaminopropylidene) - 9,10 - dihydro-4H - benzo[5,6]cyclohepta[1,2-d]thiazole (mixture of cis and trans)

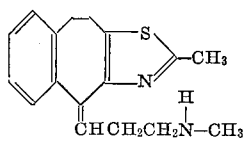

A mixture of 8.036 g. of 4-(3-dimethylaminopropylidene)-2-methyl-9,10 - dihydro - 4H - benzo[5,6]cyclohepta[1,2-d]thiazole (cis and trans isomer mixture, obtained as described in Example 1) 4.82 g. of ethyl chlorocarbonate and 40 ml. of toluene is refluxed for 24 hours. The solution is cooled to room temperature and any unchanged starting material is removed by subsequent extraction with 10 ml. portions of 2 N hydrochloric acid. The toluene solution is then washed with water, dried over sodium sulfate and evaporated to obtain the intermediate, i.e., 4-(3-carbethoxy - 3 - methylaminopropylidene) - 2 - methyl - 9,10 - dihydro - 4H - benzo[5,6]-cyclohepta[1,2-d]thiazole as a residue. The mass of intermediate so obtained is heated under reflux for 18 hours, under a nitrogen atmosphere, with a mixture of 6.7 g. of potassium hydroxide and 65 ml. of n-butanol. After vacuum evaporation to 5 g., the residue is taken up in 80 ml. of benzene and 80 ml. of water and the benzene layer is washed several times with water; then, the benzene layer is extracted six times with 20 ml. of 2 N hydrochloric acid. This acid aqueous solution is made strongly basic (pH 12 to 14) by the addition of potassium hydroxide and exhaustively extracted with methylene chloride. The dried methylene chloride solution is evaporated to obtain the product as an oil, which is then purified by vacuum distillation (130° C. bath temperature, 0.001 mm. pressure).

The product is a mixture of trans and cis isomers of the title compound, which is characterized by its NMR spectrum (60 megahertz, CDCl₃ solution, tetramethylsilane as internal standard):

trans; vinyl proton; triplet centered at δ5.81 p.p.m.;
cis; vinyl proton; triplet centered at δ6.54 p.p.m.

EXAMPLE 3

2 - methyl - 4-(3-methylaminopropylidene)-9,10-dihydro-4H - benzo[5,6]cyclohepta[1,2-d]thiazole (mixture of cis and trans; alternative process)

Step A—preparation of 4-(3-cyano - 3 - methylaminopropylidene) - 2-methyl-9,10 - dihydro - 4H - benzo[5,6] cyclohepta[1,2-d]thiazole.—A solution of 7.8 g. of cyanogen bromide in 30 ml. of absolute benzene is added, dropwise at room temperature, to a solution of 15.0 g. of 4 - (3 - dimethylaminopropylidene) - 2 - methyl - 9,10-dihydro-4H - benzo[5,6]cyclohepta[1,2-d]thiazole in 40 ml. of absolute benzene, the mixture allowed to stand at 20° C. for 12 hours and then evaporated under vacuum to dryness to obtain a residue. The residue is triturated with 100 ml. of diethyl ether, the resulting mixture filtered and the filtrate evaporated to dryness to obtain 4-(3-cyano-3-methylaminopropylidene)-2-methyl-9,10-dihydro - 4H-benzo[5,6]cyclohepta[1,2-d]thiazole.

Step B—preparation of 2-methyl-4-(3 - methylaminopropylidene) - 9,10 - dihydro-4H-benzo[5,6]cyclohepta-[1,2-d]thiazole (mixture of cis and trans; alternative process).—9.2 g. of 4-(3-cyano-3-methyl-aminopropylidene) - 2-methyl-9,10-dihydro-4H - benzo[5,6]cyclohepta [1,2-d]thiazole (obtainable according to the procedure described above in Step A) is mixed with 22 ml. of glacial acetic acid, 22 ml. of 11 N hydrochloric acid and 146 ml. of water and the mixture heated under reflux for 4 hours. The reaction mixture is then evaporated under vacuum to obtain a residue. The residue is made basic (to pH 12 to 14) with 25% aqueous potassium hydroxide, extracted thrice with 50 ml. portions of benzene, the extracts combined, dried over sodium sulfate and evaporated under vacuum to yield 2-methyl-4-(3-methylaminopropylidene)-9,10-dihydro - 4H - benzo[5,6]cyclohepta[1,2-d] thiazole as a mixture of cis and trans isomers.

EXAMPLE 4

4 - (3 - dimethylaminopropylidene) - 2-methyl-9-phenyl-9,10 - dihydro - 4H - benzo[5,6]cyclohepta[1,2 - d] thiazole (mixture of cis and trans)

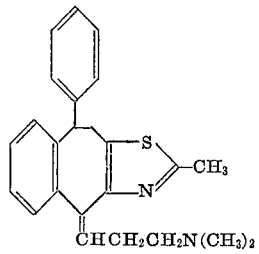

Step A—preparation of 6-isonitroso-9-phenyl - 6,7,8,9-tetrahydro-5H-benzocyclohepten-5 - one.—Following the procedure of Step A of Example 1 and employing an equivalent amount of 9 - phenyl-6,7,8,9-tetrahydro-5H-benzocyclohepten-5-one in place of the 6,7,8,9-tetrahydro-5H-benzocyclohepten-5-one used therein, there is obtained 6-isonitroso-9-phenyl - 6,7,8,9-tetrahydro - 5H - benzo-cyclohepten-5-one, M.P. 176° C.

Step B—preparation of 2-methyl-9-phenyl-9,10-dihydro - 4H - benzo[5,6]cyclohepta[1,2-d]oxazol - 4 - one.—Following the procedure of Step B of Example 1 and employing an equivalent amount of 6-isonitroso-9-phenyl-6,7,8,9-tetrahydro - 5H - benzocyclohepten - 5 - one in place of the 6-isonitroso-6,7,8,9-tetrahydro-5H - benzocyclohepten-5-one used therein, there is obtained 2-methyl-9 - phenyl - 9,10 - dihydro - 4H - benzo[5,6]cyclohepta[1,3-d]oxazol-4-one, M.P. 192° to 193.5° C.

Step C—preparation of 2-methyl-9-phenyl-9,10-dihydro-4H-benzo[5,6]cyclohepta[1,2-d]thiazol-4-one. — Following the procedure of Step C of Example 1 and employing an equivalent amount of 2-methyl-9-phenyl-9,10-dihydro-4H-benzo[5,6]cyclohepta[1,2]oxazol-4-one in place of the 2-methyl-9,10-dihydro-4H-benzo[5,6]cyclohepta[1,2-d]oxazol-4-one used therein, there is obtained 9-phenyl-9,10 - dihydro-4H-benzo[5,6]cyclohepta[1,2-d]thiazol-4-one.

Step D—preparation of 4-(3-dimethylaminopropyl)-4-hydroxy - 2-methyl-9-phenyl-9,10-dihydro-4H-benzo[5,6]cyclohepta[1,2-d]thiazole.—Following the procedure of Step D of Example 1 and employing an equivalent amount of 2 - methyl-9-phenyl-9,10-dihydro-4H-benzo[5,6]cyclohepta[1,2-d]thiazol-4-one in place of the 2-methyl-9,10-dihydro - 4H - benzo[5,6]cyclohepta[1,2d]thiazol - 4-one used therein, there is obtained 4-(3-dimethylaminopropyl)-4 - hydroxy - 2-methyl - 9-phenyl-9,10-dihydro-4H-benzo[5,6]cyclohepta[1,2-d]thiazole.

Step E—preparation of 4-(3-dimethylaminopropylidene) - 2-methyl-9-phenyl-9,10-dihydro-4H-benzo[5,6]cyclohepta[1,2-d]thiazole.—Following the procedure of Step E of Example 1 and employing an equivalent amount of 4 - (3 - dimethylaminopropyl) - 4-hydroxy-2-methyl-9-phenyl - 9,10 - dihydro - 4H-benzo[5,6]cyclohepta[1,2-d]thiazole in place of the 4-(3-dimethylaminopropyl)-4-hydroxy - 2 - methyl-9,10-dihydro-4H-benzo[5,6]cyclohepta[1,2-d]thiazole used therein, there is obtained 4-(3-dimethylaminopropylidene) - 2 - methyl-9-phenyl-9,10-dihydro-4H-benzo[5,6]cyclohepta[1,2-d]thiazole as a mixture of cis and trans isomers.

4 - (3 - dimethylaminopropylidene)-2-methyl-9-phenyl-9,10 - dihydro - 4H - benzo[5,6]cyclohepta[1,2-d]thiazole isomers may be converted to the corersponding isomers of 2 - methyl - 4 - (3-methylaminopropylidene)-9,10-dihydro-4H-benzo[5,6]cyclohepta[1,2-d]diazole by following the procedures described in Examples 2 and 3.

EXAMPLE 5

8-chloro-4-(3-dimethylaminopropylidene)-2-methyl-9,10-dihydro-4H-benzo[5,6]cyclohepta[1,2-d]oxazole (mixture of cis and trans)

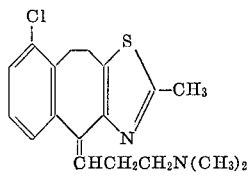

Step A—preparation of 1-chloro-6,7,8,9-tetrahydro-5H-benzocyclohepten-5-one.—Into a mixture of 222 g. of 6,7,8,9-tetrahydro-5H-benzocyclohepten-5-one, 442.4 g. of anhydrous aluminum chloride and 500 ml. of 1,1,2,2-tetrachloroethane, stirred at 25° C., there is introduced, over a period of 4 hours, 130 g. of chlorine. Then the mixture is poured onto a mixture consisting of 4 kg. of ice and 550 ml. of 11 N hydrochloric acid. The organic phase is separated and the aqueous phase is extracted thrice with 100 ml. portions of chloroform. The organic phases are combined and washed twice with 200 ml. portions of 2 N hydrochloric acid, washed twice with 200 ml. portions of water, dried over sodium sulfate, and evaporated to give an oil, which is then fractionated on a spinning band column to give the following products:

(a) 1-chloro-6,7,8,9-tetrahydro-5H-benzocyclohepten-5-one: B.P. 130° to 131° C./2.7 mm.; $n_D^{20} = 1.5764$; oxime, M.P. 136° to 138° C.; and
(b) 3-chloro-6,7,8,9-tetrahydro-5H-benzocyclohepten-5-one: B.P. 143° to 146° C./2.9 mm.; M.P. 36° to 40° C.; oxime, M.P. 138° to 142° C.

Step B—preparation of 1-chloro-6-isonitroso-6,7,8,9-tetrahydro-5H-benzocyclohepten-5-one. Following the procedure of Step A of Example 1 and employing an equivalent amount of 1-chloro-6,7,8,9-tetrahydro-5H-benzocyclohepten-5-one in place of the 6,7,8,9-tetrahydro-5H-benzocyclohepten-5-one used therein, there is obtained 1 - chloro - 6-isonitroso-6,7,8,9-tetrahydro-5H-benzocyclohepten-5-one, M.P. 174° to 175° C. (from diethyl ether-petroleum ether; 1:1).

Step C—preparation of 8-chloro-2-methyl-9,10-dihydro-4H-benzo[5,6]cyclohepta[1,2-d]oxazol-4-one. — Following the procedure of Step B of Example 1 and employing an equivalent amount of 1 - chloro-6-isonitroso-6,7,8,9-tetrahydro-5H-benzocyclohepten-5-one in place of the 6-isonitroso - 6,7,8,9-tetrahydro-5H-benzocyclohepten-5-one used therein, there is obtained 8-chloro-2-methyl-9-10-dihydro - 4H - benzo[5,6]cyclohepta[1,2-d]oxazol-4-one, M.P. 125° to 126° C.

Step D—preparation of 8-chloro-2-methyl-9,10-dihydro-4H-benzo[5,6]cyclohepta[1,2-d]thiazol-4-one. — Following the procedure of Step C of Example 1, and employing an equivalent amount of 8-chloro-2-methyl-9,10-dihydro-4H-benzo[5,6]cyclohepta[1,2-d]oxazol-4-one in place of the 2-methyl-9,10-dihydro-4H-benzo[5,6]cyclohepta[1,2-d]oxazol-4-one used therein, there is obtained 8-chloro - 2 - methyl-9,10-dihydro-4H-benzo[5,6]cyclohepta[1,2-d]thiazol-4-one.

Step E—preparation of 8-chloro-4-(3-dimethylaminopropyl) - 4-hydroxy-2-methyl-9,10-dihydro-4H-benzo[5,6]cyclohepta[1,2-d]thiazole.—Following the procedure of Step D of Example 1 and employing an equivalent amount of 8 - chloro-2-methyl-9,10-dihydro-4H-benzo[5,6]cyclohepta[1,2-d]thiazol-4-one in place of the 2-methyl-9,10-dihydro - 4H - benzo[5,6]cyclohepta[1,2-d]thiazol-4-one used therein, there is obtained 8-chloro-4-(3-dimethylaminopropyl) - 4-hydroxy-2-methyl-9,1-dihydro-4H-benzo[5,6]cyclohepta[1,2-d]thiazole.

Step F—preparation of 8-chloro-4-(3-diemthylaminopropylidene) - 2-methyl-9,10-dihydro-4H-benzo[5,6]cyclohepta[1,2-d]thiazole.—Following the procedure of Step E of Example 1 and employing an equivalent amount of 8 - chloro-4-(3-dimethylaminopropyl)-4-hydroxy-2-methyl - 9,10-dihydro-4H-benzo[5,6]cyclohepta[1,2-d]thiazole in place of the 4-(3-dimethylaminopropyl)-4-hydroxy-2-methyl - 9,10 - dihydro-4H-benzo[5,6]cyclohepta[1,2-d]thiazole used therein, there is obtained 8-chlro-4-(3-dimethylaminopropylidene) - 2 - methyl - 9,10-dihydro-4H-benzo[5,6]cyclohepta[1,2-d]thiazole as a mixture of cis and trans isomers.

8 - chloro - 4 - (3-dimethylaminopropylidene)-2-methyl-9,10-dihydro-4H-benzo[5,6]cyclohepta[1,2-d]thiazole isomers may be converted to the corresponding isomers of 8-chloro - 2 - methyl - 4 - (3-methylaminopropylidene)-9,10-dihydro-4H-benzo[5,6]cyclohepta[1,2-d]thiazole by following the procedures described in Examples 2 and 3.

Similarly, the 3-chloro-6,7,8,9-tetrahydro-5H-benzocyclohepten-5-one obtained as a coproduct in Step A of Example 5 can be used as a starting material for the preparation of 6-chloro-4-(3-dimethylaminopropylidene) - 2-methyl-9,10 - dihydro - 4H - benzo[5,6]cyclohepta[1,2-d]thiazole and subsequently 6 - chloro - 2 - methyl-4-(3-methylaminopropylidene) - 9,10 - dihydro - 4H - benzo[5,6]cyclohepta[1,2-d]thiazole, by adapting the procedures described in Example 5.

Following the procedure of Step B of Example 1, but replacing the acetic acid and acetic anhydride with equivalent amounts of propionic acid and propionic anhydride, 2-ethyl-9,10-dihydro - 4H - benzo[5,6]cyclohepta[1,2-d]oxazol-4-one is obtained, which can be used as a starting material for the preparation of 4-(3-dimethylaminopropylidene) - 2 - ethyl-9,10-dihydro-4H-benzo[5,6]cyclohepta[1,2-d]thiazole by adapting the procedure described in Example 1, which can be used for the preparation of 2-ethyl - 4 - (3-methylaminopropylidene)-9,10-dihydro-4H-benzo[5,6]cyclohepta[1,2-d]thiazole by adapting the procedures described in Examples 2 and 3.

What is claimed is:

1. A compound of the formula

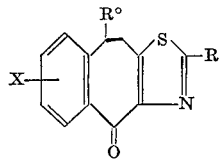

wherein

R represents lower alkyl;
R° represents hydrogen or phenyl; and
X represents hydrogen or halogen.

2. The compound of claim 1 which is 2-methyl-9,10-dihydro-4H-benzo[5,6]cyclohepta[1,2-d]thiazol-4-one.

3. A process for preparing a 2-lower alkyl-9,10-dihydro-4H-benzo[5,6]cyclohepta[1,2-d]thiazol - 4 - one of the formula

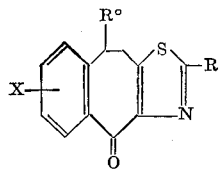

wherein

R represents lower alkyl;
R° represents hydrogen or phenyl; and
X represents hydrogen or halogen;

which comprises contacting the corresponding 2-lower alkyl-9,10-dihydro - 4H - benzo[5,6]cyclohepta[1,2-d]oxazol-4-one of the formula

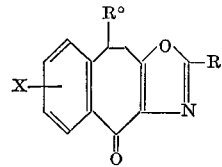

wherein R, R° and X are as defined above, in an inert polar organic solvent with an alkali hydrosulfide.

4. A process of claim 3 wherein the alkali hydrosulfide is an alkali-metal hydrosulfide.

5. A process of claim 4 wherein the alkali-metal hydrosulfide is potassium hydrosulfide.

References Cited
UNITED STATES PATENTS 3,442,903   5/1969   Galantay _____ 260—302

ALEX MAZEL, Primary Examiner

R. J. GALLAGHER, Assistant Examiner

U.S. Cl. X.R.

260—307, 566; 424—200, 270